(12) United States Patent
Boyle et al.

(10) Patent No.: US 10,410,209 B2
(45) Date of Patent: Sep. 10, 2019

(54) ELECTRONIC TRANSACTION SYSTEM AND METHOD WITH PARTICIPANT AUTHENTICATION VIA SEPARATE AUTHORITY FROM REAL-TIME PAYMENT VALIDATION

(71) Applicant: SHAZZLE LLC, Braintree, MA (US)

(72) Inventors: Clifford F. Boyle, Scottsdale, AZ (US);
Robert E. McGill, Rumson, NJ (US);
Igor V. Slepinin, West Hartford, CT (US)

(73) Assignee: SHAZZLE, LLC, Braintree, MA (US)

( * ) Notice: Subject to any disclaimer, the term of this patent is extended or adjusted under 35 U.S.C. 154(b) by 1071 days.

(21) Appl. No.: 14/486,420

(22) Filed: Sep. 15, 2014

(65) Prior Publication Data

US 2015/0081567 A1    Mar. 19, 2015

Related U.S. Application Data

(60) Provisional application No. 61/878,165, filed on Sep. 16, 2013.

(51) Int. Cl.
*G06Q 20/02* (2012.01)
*G06Q 20/36* (2012.01)
(Continued)

(52) U.S. Cl.
CPC ......... *G06Q 20/3678* (2013.01); *G06Q 20/02* (2013.01); *G06Q 20/10* (2013.01);
(Continued)

(58) Field of Classification Search
CPC .... G06Q 20/3678; G06Q 20/02; G06Q 20/10; G06Q 20/3829; G06Q 20/401; G06Q 20/405
(Continued)

(56) References Cited

U.S. PATENT DOCUMENTS 5,175,682 A * 12/1992 Higashiyama ..... G06K 17/0022
                                                           235/379
6,516,996 B1 * 2/2003 Hippelainen .......... G06Q 20/04
                                                           235/379
(Continued)

OTHER PUBLICATIONS

Bearer Instrument Law and Legal Definition, USLegal, Inc., retrieved from https://definitions.uslegal.com/b/bearer-instrument/ [Apr. 3, 2018 2:20:15 PM], 3 pages (Year: 2018).*
(Continued)

*Primary Examiner* — James D Nigh
(74) *Attorney, Agent, or Firm* — J.A. Lindeman & Co. PLLC; Jeffrey Lindeman; Joseph Parisi

(57) ABSTRACT

A system and method of exchanging assets splits authentication of the parties in the transaction from real-time validation of the assets used in the transaction. Electronic representations of currency or other value of an asset provide a mechanism for the electronic transfer of the ownership of those assets. Digital tokens or other electronic money is created, issued, purchased, validated, and redeemed within an electronic exchange. Ownership of the token is established by the physical possession of the token along with a public key certificate that decrypts the owner's copy of the token. Tokens are stored in digital wallets and are transferred using private p2p communications channels or NFC. The separation of the authentication of the parties using an authentication authority (registry) and the validation of the assets using a transaction authority allows personal anonymity. Privacy is maintained, and no single authority has a complete audit trail of the transaction.

18 Claims, 7 Drawing Sheets

(51) Int. Cl.
*G06Q 20/40* (2012.01)
*G06Q 20/10* (2012.01)
*G06Q 20/38* (2012.01)

(52) U.S. Cl.
CPC ....... *G06Q 20/3829* (2013.01); *G06Q 20/401* (2013.01); *G06Q 20/405* (2013.01)

(58) Field of Classification Search
USPC .......................................................... 705/71
See application file for complete search history.

(56) References Cited

U.S. PATENT DOCUMENTS

| | | | | |
|---|---|---|---|---|
| 6,601,761 B1* | 8/2003 | Katis | G06Q 20/02 | 235/379 |
| 6,981,023 B1* | 12/2005 | Hamilton | H04L 29/12009 | 709/206 |
| 8,099,598 B1* | 1/2012 | Liu | H04L 9/006 | 380/255 |
| 8,416,711 B1* | 4/2013 | Pinding | H04L 61/2546 | 370/254 |
| 8,682,802 B1* | 3/2014 | Kannanari | G06Q 20/367 | 705/64 |
| 9,105,021 B2* | 8/2015 | Tobin | G06Q 20/20 | |
| 9,646,303 B2* | 5/2017 | Karpenko | G06Q 20/3829 | |
| 2009/0012896 A1* | 1/2009 | Arnold | G06Q 20/10 | 705/39 |
| 2012/0110322 A1* | 5/2012 | Slepinin | H04L 51/14 | 713/152 |
| 2012/0178513 A1* | 7/2012 | Jackson | G07F 17/3244 | 463/17 |
| 2013/0065670 A1* | 3/2013 | Michaelson | G07F 17/3244 | 463/25 |
| 2013/0117400 A1* | 5/2013 | An | H04L 63/0823 | 709/206 |
| 2013/0212015 A1* | 8/2013 | Anthony | G06Q 20/108 | 705/42 |
| 2014/0195626 A1* | 7/2014 | Ruff | H04L 63/104 | 709/206 |
| 2014/0279479 A1* | 9/2014 | Maniar | G06Q 20/36 | 705/41 |
| 2015/0032625 A1* | 1/2015 | Dill | G06Q 20/385 | 705/44 |
| 2015/0032627 A1* | 1/2015 | Dill | G06Q 20/385 | 705/44 |
| 2015/0046338 A1* | 2/2015 | Laxminarayanan | G06Q 20/38215 | 705/67 |
| 2015/0052064 A1* | 2/2015 | Karpenko | G06Q 20/3829 | 705/71 |
| 2015/0088754 A1* | 3/2015 | Kirsch | G06Q 20/0855 | 705/71 |
| 2015/0302398 A1* | 10/2015 | Desai | G06F 8/60 | 705/41 |
| 2015/0356555 A1* | 12/2015 | Pennanen | G06Q 20/06 | 705/71 |

OTHER PUBLICATIONS

Definition of Bearer Instrument, https://www.investopedia.com/terms/b/bearer-instrument.asp, 1 page (Year: 2018).*

* cited by examiner

FIGURE 2  Purchase Transaction

FIGURE 4     Validate Token Transaction

FIGURE 5  Redeem Token Transaction

FIGURE 6  Token Encryption Scheme

ELECTRONIC TRANSACTION SYSTEM AND METHOD WITH PARTICIPANT AUTHENTICATION VIA SEPARATE AUTHORITY FROM REAL-TIME PAYMENT VALIDATION

CROSS-REFERENCE TO RELATED APPLICATIONS

This application claims priority to U.S. Provisional Patent Application No. 61/878,165, filed on Sep. 16, 2013. The entire contents of the provisional application are incorporated herein by reference.

TECHNICAL FIELD

This technology generally relates to electronic payment transactions and more specifically to electronically exchanging assets between parties while ensuring the validity of the exchange and the anonymity of the parties.

BACKGROUND

Electronic commerce businesses and electronic payment transaction systems have become increasingly popular, and significant investment and effort are employed to continue development of improved systems for facilitating such transactions. The most common systems are use of credit cards, or Pay Pal or similar "wallet" services tied to a user's bank account. Wallet services allow users to make electronic commerce transactions and can also be used to authenticate the holder's credentials. One drawback of these and other current systems is the loss of privacy they demand, since verification and authentication is most commonly achieved by identifying personal identity of the user or otherwise proving the user's knowledge of and control over his account before the transaction is allowed to proceed. Authentication is particularly a problem if the parties do not know each other and/or are not dealing with each other face to face. In such cases, various forms of identification, such as passwords, may be required as a condition of completion of the transaction.

Current systems further require audit accountability in much the way bank checking accounts do. Cash systems do not require such audit accountability. The audit accountability gives rise to another privacy drawback of these systems in their central organization, which tracks all ends of the transaction and stores them in a centralized system subject to audit. Again, this is similar to the way in which a bank organizes and stores checking account information, but very different from the way cash is tracked.

Another drawback of these electronic payment systems is that user account and identity information must be given over to the centralized party or parties organizing the transaction. The replication of a user's data and central storage of it creates a target for identity thieves. Many systems delete user information at the end of each transaction/session, so each new transaction must demand key account and identification information, which can be cumbersome to enter. Additionally, many of these systems require special hardware devices to execute payment when used in a physical store. For example, PINs must be entered in authentication devices connected to the buyer's and/or seller's financial network, and authentication-when-not-present apparatuses must be connected from sellers to credit-card issuing institutions over the network to authorize other transactions. Data unique to the buyer's account is then transmitted and often stored prior to obtaining authorizations for the transactions.

Software-based on line payment systems such as Bitcoin, often use values not tied directly to legal currency but rather to its own unit of account. These software-based on line payment systems are often in conflict with the existing banking system. Payments are made peer-to-peer without a central repository or single administrator, resulting in a decentralized virtual currency. These systems often provide an insecure value that floats with the market.

An electronic commerce platform should be convenient, secure, and transparent. Different approaches have been used in the past to provide different levels of convenience, security, and transparency.

SUMMARY

Despite the adoption of many of the prior systems, none of them provides electronic payments that function like paper cash in a transaction. In this disclosure, many of the examples discuss systems and methods used to facilitate electronic transactions between buyers and sellers in proximate exchanges and in virtual exchanges conducted over a computer network, such as the Internet, for example. It should be understood that the systems and techniques in accordance with the claimed invention can also provide secure transactions, exchanges, and conversions of currency and other valuable assets using a single computer or a single computer network, depending upon the buying computer and the selling computer. Additionally, multiple buying and selling computers can be employed, such as when more than one buyer purchases an item from a store, for example.

The claimed invention provides a system and method of exchanging assets between parties. The claimed invention relates to electronic representations of currency or other intrinsic value of an asset and provides a mechanism for the electronic transfer of the ownership of those assets. The claimed invention provides an electronic instantiation of a promise to make a payment in currency, similar to an electronic bearer bond. For example, the claimed invention creates an electronic instrument of value that is backed by money and that can be transferred with validity and anonymity approximating paper currency.

An authentication authority can be used to confirm that both parties are eligible and authorized to conduct an electronic exchange. Individual electronic exchanges can be subject to rules that can restrict eligibility of the parties. A separate transaction authority can be used to confirm the value of the assets and that an actual exchange of assets occurs.

The value of the assets can be stored in a computer database as an electronic representation of money or other intrinsic value. The system and method of the claimed invention electronically transfers the ownership of those assets from party to party with validity and anonymity approximating that represented by paper currency in a traditional goods and services exchange economy.

A Token in accordance with the claimed invention represents an actual deposit amount of regulated currency (as opposed to instructions on how to access money). The use of the Token is not tied to an account, so the use cannot be easily traced, and it does not require the owner to provide personal identification to spend it. Information on the Token's transfer is not recorded and stored by any central authority that can provide a complete audit trail to the transaction.

The system of the claimed invention gives the owner of the digital cash (Token) physical possession of the Token on the owner's computing device, as if the owner had cash. However, the system is not a bearer system in totality, so the loss of a Token is not like the loss of cash. Instead, a verification authority's reference copy of the Token can be accessed by the Owner as long as the owner has possession of a decryption key. The reference copy stored with the verification authority provides a measure of security in the case of loss or theft of the Token.

The Owner's physical possession of the Token allows the system to process a purchase transaction much like cash is processed. A Seller (receiver) does not need personal identification for the Owner (buyer), but only needs to know that the Token is not counterfeit. A verification authority provides this validity. The verification authority tracks only the validity of the Token and has no information on the parties or the transaction. A separate authentication authority (registry) validates the system identity of the parties, but not their personal identity. In this disclosure, the "authentication authority" and the "registry" are used synonymously. The authentication authority has no currency or other information about the transaction. Owner (buyer) and Receiver (seller) transact the financial settlement between themselves and are the only parties with knowledge of the amount and description of the transaction, just like a cash transaction.

The stored value electronic token is encrypted by the verification authority when it is created (inner encryption) and again by whomever possesses the stored value electronic token (outer encryption). Because the outer layer of the token must be decrypted to be used in a transaction, only a person who possesses the decryption key can use this stored value electronic token. This provides significant protection against the loss or theft of a stored value token. In addition, because the stored value electronic token is encrypted by the verification authority, only that verification authority can certify that token as being valid and not double spent/counterfeited.

The claimed invention includes a system and a method for performing a real-time digital monetary transaction between a buyer and a seller, where the transaction is split into an authorization of parties to the transaction by an authentication authority and verification of currency of the transaction by a separate transaction authority. The systems and methods can include relayed communications when a party cannot be directly addressed. Additionally, the systems and methods of the claimed invention can include encryption and decryption techniques to complement the security afforded by the separate authentication authority for authorization of the parties and the transaction authority for verification of the currency of the transaction.

One example method of the claimed invention includes connecting the buyer, the seller, an authentication authority, and a transaction authority over a network and sending an electronic request from the buyer to the authentication authority over the network to obtain a seller's address. When using encryption and decryption techniques, the request can also include a request for the seller's public key. When using relayed communications, such as when a party cannot be directly addressed, the request can also include a request for an address of a dynamic relay to connect the buyer and seller. Sending the digital token to the seller from the buyer can be performed on a peer-to-peer (p2p) network over the Internet, WiFi, or a local area wireless network or by using NFC techniques. The electronic request can be sent using SSL, DDS, TLS transmission protocols and the like. The request from the buyer to the authentication authority over the network can also include a request for a network addressability status of the seller and an on-off status of the seller to establish a direct p2p connection between the buyer and seller.

Once the seller's address is obtained, the methods include sending a digital token from the buyer to the seller. The digital token can be encrypted with the obtained public key of the seller when using encryption and decryption and can be sent via a dynamic relay when the party (parties) cannot be directly addressed. The digital token can be a bearer instrument or other instrument that represents an actual deposit amount of regulated currency (as opposed to instructions on how to access money).

When using encryption and decryption, the seller decrypts the received digital token. Otherwise, the seller obtains an address of a transaction authority from the authentication authority and sends the digital token to the transaction authority. When the party (parties) cannot be directly addressed, the seller can dynamically obtain an address of a dynamic transaction relay from the authentication authority to connect the seller to the transaction authority and then send the digital token to the transaction authority via the dynamic transaction relay. The token can be sent to the transaction authority using SSL, DDS, TLS transmission protocols and the like.

The transaction authority validates the digital token and generates a new token to update ownership of the token to the seller. The new token is then sent from the transaction authority to the seller. When the party (parties) cannot be directly addressed, the new token can be sent from the transaction authority to the seller via a dynamic transaction relay. The transaction authority can also update its records of exchanged tokens.

To validate the transaction, the transaction authority can compare the submitted digital token to a token exchange file in the transaction authority and respond with a notice regarding the validity status of the digital token. For example, the response can include a notice that the digital token is invalid when an identifier of the digital token is not found in the token exchange file. Similarly, the response can include a notice that the digital token is out of date when the identifier of the digital token is found in the token exchange file but the digital token has already been exchanged. Likewise, the response can include responding with a notice that the digital token is valid when the identifier of the digital token is found in the token exchange file and the digital token has not already been exchanged. When the new token or tokens are created after the exchange, the submitted digital token can be invalidated on the token exchange file to prevent multiple submissions of the same digital token. The token exchange file can provide an inventory of tokens in circulation, identification of the tokens, and the status of the tokens.

Validating the digital token can also include checking a value of the digital token against a predetermined digital token amount and sending the digital token from the transaction authority to the verification authority when the value exceeds the predetermined digital token amount. The digital token can be verified against a token master file at the verification authority, and a response regarding the validity status of the digital token can be provided. For example, a response of invalid token message to the transaction authority can be provided when the identifier of the digital token is not found in the token master file. Similarly, a response of an out of date message to the transaction authority can be provided when the identifier of the digital token is found in the token master file but the digital token has already been redeemed, and a response with a notice that the digital token is valid can be provided to the transaction authority when the identifier of the digital token is found in the token master file and the digital token has not already been redeemed.

Once the transaction has been validated or a status has otherwise been provided, the seller sends an electronic request to the authentication authority to obtain the buyer's address. As before, when using encryption and decryption techniques, the request can also include a request for the buyer's public key, and when using relayed communications, such as when a party cannot be directly addressed, the request can also include a request for an address of a dynamic contact relay to connect the seller and buyer. The request from the seller to the authentication authority can also include a request for a network addressability status of the buyer and an on-off status of the buyer to establish a direct p2p connection between the seller and buyer.

The seller can then send a receipt for the purchase to the buyer. The receipt can be encrypted if desired and sent via the contact relay when the party (parties) is not directly addressable. During the exchange of the token and sending a receipt to the buyer, the transaction authority can mark the (re)generated new token as on hold on a token exchange register in the transaction authority for a predetermined amount of time for the buyer to confirm delivery of the encrypted receipt. The transaction authority can change the on hold marking to a valid marking after a predetermined amount of time during which the buyer does not report problems with delivery of the receipt and can extend the on hold marking when the buyer reports problems with delivery of the receipt.

If the buyer overpays the seller with a token for an amount larger than the good and/or service was sold, the transaction authority can split the (re)generated new token into two or more tokens, where the sum of a value of the two or more tokens equals the value of the regenerated new token. The transaction authority can then provide one or more of the two tokens to the buyer as change in the transaction.

Issuing the digital tokens and redeeming the digital tokens can be carried out in a similar fashion as described below with regard to the Figures.

A buyer and seller both run an application on their computing devices that support private electronic commerce with terms spelled out in a regulatory agreement. For example, the buyer and seller can use smart phones as a buyer computer and a seller computer. The buyer computer and the seller computer use a software application instantiated on a computer readable medium to perform a digital cash transaction method in accordance with the claimed invention. In the examples below, the computer buyer computer and the seller computer are configured as smartphones with a Digital Cash (DC) application running on the smartphones.

Purchases and other exchanges can be made using the exchange of the claimed invention. When a buyer determines it wishes to purchase a good or service from a seller, the parties connect to each other using Near Field Communication (NFC) protocols on their smartphones. Likewise, an exchange between a buyer and seller can be performed using a peer-to-peer location service. The example exchanges outlined below show an example system configured to use a peer-to-peer p2p location service and registry.

The exchange of the claimed invention employs systems and methods that can be embodied in a software application that allows parties to connect in a secure p2p path from not only static computing devices like fixed computers, but also from smartphones or tablets that may frequently change IP addresses and network addressability status.

Smartphones are different from static computers in that they are sometimes directly addressable and at other times are not. Direct addressability simply means that a device can receive electronic messages directly from devices outside of the local network. Some devices exist behind firewalls or other networking hardware that prevents devices outside the local network from communicating with them directly unless they have first requested a response from the out-of-network device. A classic example of a device that is not directly addressable is a PC that is behind a firewall implementing Network Address Translation (NAT). These PCs cannot receive any electronic messages from devices outside of the firewall. They can only receive electronic messages after they have requested a message (in response to their request). Likewise, phones connected via a cellular network are not directly addressable so they cannot receive a request to deliver an email message from a recipient directly from the recipient. They must instead use a relay device to connect the sending phone and the recipient.

Depending upon the type of protocol employed to connect to the network, the system and method of the claimed invention can effectively determine the most efficient manner in which to facilitate an electronic exchange between the parties.

Parties using the claimed invention can share data directly without using the store and forward protocol of the web where servers controlled by third parties collect and store information before sending on to receivers. In this way, the authentication authority (registry) of the claimed invention allows private communication where only buyer and seller have knowledge of the content of the exchange. The authentication authority (registry) supports the use of digital cash by connecting the sender and receiver. The authentication authority (registry) does not receive a copy of the data Buyer and Seller transmit once they are connected. The type of communication is unknown to the authentication authority, be it an email communication or a digital cash transaction, or the like.

The authentication authority (registry) uses a central server to keep track of user's IP location and status (on/off, network addressability). The buyer contacts the authentication authority (registry) to update information and to request seller location information and a Public Key for encryption. The authentication authority (registry) passes the seller IP address and status to the buyer, and the buyer uses this information to make a secure p2p connection to seller.

A buyer receives a data packet from a seller. The data packet describes the transaction, including payment that must be satisfied. The buyer decrypts its digital cash token (representing currency) and encrypts it with seller's public key. The buyer forwards the token, through a peer relay marshalled by the authentication authority (registry), to the seller through a p2p secure connection.

The relays of the claimed invention are dynamic relays, which is intended to indicate that the relay is marshalled when needed (on the fly). The relays are not typically static relays, such as a server device provisioned to serve as a relay for all users who might need one. The distinction between dynamic and static relays is relevant to the privacy of the transmissions that flow through a relay. With static relays, there exists an easy choke point where an authority, governmental or otherwise, could tap into the communications. Likewise, an unauthorized user (e.g., hacker) could also access communications using the static relay choke point. In the claimed invention, dynamic relays exist only for the time necessary to transfer a message, a token and the like. The dynamic relay may exist for only a few seconds, and then closes. So there is no practical ability to find it, tap it, and access the message passing through it. In the example embodiments depicted in the drawings and descriptions, the relays are dynamic in nature.

The seller contacts a transaction authority/validating authority to route the token to a verification authority (which may be a bank). The transaction authority/validating authority is trusted with digital tokens that can be exchanged for cash deposits, so the transaction authority/validating authority is often a regulated entity like a bank, or perhaps an entity owned and controlled by a consortium of banks, for example. The transaction authority/validating authority and banks can be regulated by a regulatory agreement which spells out the method and responsibilities for handling digital cash tokens and the money deposits backing them up.

The seller requests a peer relay through the registry, then establishes an SSL connection to the fixed location of the transaction authority/validating authority through the relay. The seller bounces the transaction data and token through the relay to the transaction authority/validating authority.

The transaction authority/validating authority validates the token against its registry, then marks it spent and encrypts and registers a new token which will be held in "escrow" in its registry for a pre-determined length of time as specified in the regulatory agreement. If necessary, the transaction authority/validating authority breaks the token into exact change and leftover funds. The transaction authority/validating authority then sends the new token(s) and transaction confirmation to the relay that delivers the tokens and confirmation through the still-open SSL connection to the seller.

The seller locates the buyer through the authentication authority (registry) and delivers a transaction receipt and change (if any). Goods and/or services are delivered as specified in an underlying purchase contract.

If the buyer does not receive a seller receipt within a length of time specified by the regulatory agreement, the buyer can contact the transaction authority/validating authority and request that the transaction be held in escrow, pending resolution. The buyer may have to break anonymity to do so. The buyer notifies the seller of the hold status, and the seller has a time period specified by the transaction authority/validating authority to verify its right to the token or the token will be invalidated and the transaction cancelled. In a buyer and seller dispute, the transaction authority/validating authority places the token in escrow status on the registry, pending resolution.

DETAILED DESCRIPTION

Figure 1:
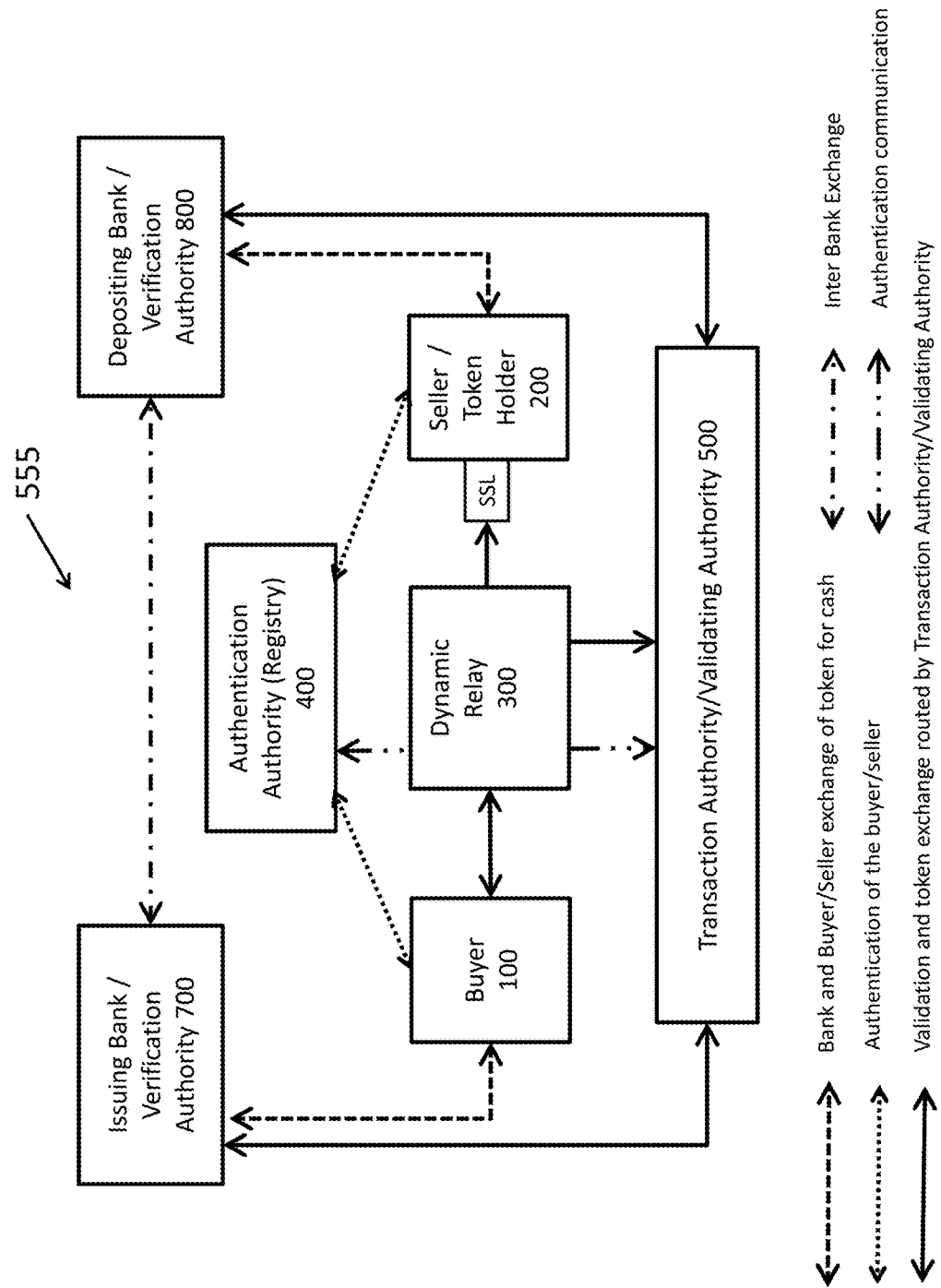
FIG. 1 is an example computer system for conducting an electronic transaction in accordance with the claimed invention.

The claimed invention includes a system and method to exchange value to effect a transaction where the authentication of the parties in the transaction is done by a separate authority from the real time authentication of the value used in the transaction. The authentication of the parties provides personal anonymity, so that privacy is maintained and no single authority has a complete audit trail of the transaction.

The value of the transaction can be represented by an electronic token. Ownership of the electronic token is established by physical possession of the token along with the Public Key Certificate (PKC) that decrypts the Owner Copy of the token. This key can be stored on a computing device in the owner's physical possession. Authorized status of the token is established by a reference copy of the token stored at a transaction authority, or validating authority (VA). A person in possession of the token along with the PKC owns the token. Transfer occurs via a "handshake" using NFC or a private p2p communications channel (PCC). Additionally, buyers and sellers can transfer tokens for goods and/or services, and the seller can have a third party present the token to the transaction authority. An authentication authority (Registry) verifies buyer and seller account status with the PCC and gives the buyer and seller connection information so they may establish a p2p connection. Buyer decrypts his token and encrypts with Seller's public key before passing token to Seller. Seller passes token to the validating authority through a dynamic relay provided by the authentication authority (registry) using an SSL connection. The validating authority verifies the authenticity of the token and updates encryption to pass possession of the token through the same SSL connection to the seller. The seller approves the transaction and sends a receipt to the buyer.

The system and method of conducting an exchange in accordance with the claimed invention ensures privacy because no single authority has an audit trail of both the token exchanged in the transaction, and account information of the parties (buyer and seller) to the transaction. Currency (e.g., the tokens) can travel electronically from a first owner to an ultimate receiver without the validating authority having any identification information on the parties, which enhances privacy and anonymity. The token is a physical representation of stored value, similar to paper money representing stored value. The validating authority is concerned solely with the validity of the token, while the authentication authority is concerned solely with the identities of the parties (buyers and sellers).

The system and method of the claimed invention can transport the token to the different parties to the transaction securely and anonymously using a system and method of delivering confidential electronic files, such as those identified in U.S. Pat. No. 8,819,412 and in U.S. patent application Ser. No. 14/467,359, the entire contents of which are incorporated by reference in this application.

Additionally, since currency (e.g., a token) is a bearer instrument, an exchange can take place without requiring personal identification. And while the tokens can operate in anonymous transfers between buyers and sellers, the token is double encrypted and must pass through a verification authority (for example, a bank, currency exchange, and the like) to be cashed out. The double encryption and the verification authority interaction make it difficult to counterfeit the tokens. At the beginning of each transfer, the (new) owner of the token signs with PKC in his personal possession, so the token is counterfeit and theft-resistant. The split between the authentication of the parties and the validation of the currency produces an environment where parties can exchange funds securely without naming persons involved in the exchange.

Overview of Tokens

Banks who wish to trade in digital cash (DC) will sign a regulatory agreement (RA) with the digital cash transaction authority/validating authority (TA). Likewise, the transaction authority/validating authority will sign a regulatory agreement with the owner of the digital cash network. The transaction authority/validating authority will often be owned by a bank or consortium of banks, for example. The transaction authority/validating authority creates, registers, and regulates DC tokens as outlined in the regulatory agreement and so must be trusted and accountable.

A bank customer purchases tokens by depositing money in the bank. The token represents a draw against the account much like a paper check. The bank holds the deposit in the customer's name and requests tokens in the like amount from the transaction authority/validating authority, representing that the bank holds a deposit as specified in the regulatory agreement. The bank passes customer DC account addresses to the transaction authority/validating authority.

The transaction authority/validating authority uses a DC application to generate a token, which is an electronic file secured by double key encryption. The electronic file has an identifier code, which the transaction authority/validating authority holds in a secure token register (not shown separately) to track status of valid or spent tokens. The transaction authority/validating authority sends the token to the bank.

The bank requests a customer public key from a p2p registry service, such as the authentication authority (registry) 400 shown in FIG. 1. The authentication authority (registry) 400 is the digital cash registry. The bank's digital cash software application wraps the token with customer (buyer) encryption using the customer's (buyer's) public key and sends the wrapped token to the customer's (buyer's) digital cash account address as directed by the authentication authority (registry). The customer (buyer) sends a receipt to the bank upon successful receipt of the wrapped token. The token is held in escrow until the bank receives receipt. If the receipt signal "times out," the transaction can be invalidated as per the regulatory agreement.

A customer who wishes to redeem a token will decrypt the token and send the token via SSL connection to the transaction authority/validating authority along with request to transfer funds as per customer direction. The transaction authority/validating authority checks it against its registry. If the token is found to be valid based upon the check against the registry, the transaction authority/validating authority looks up the issuing bank in its registry. The transaction authority/validating authority requests that the issuing bank validate funds on deposit in the amount of the token and then wire those funds as per customer's direction. The transaction authority/validating authority creates a transaction record to mark that token as spent (exchanged), and to adjust the issuing bank deposit by the amount of this withdrawal. The issuing bank accounts for the transaction using its internal accounting system as specified in the regulatory agreement. The customer sends a receipt to the transaction authority/validating authority upon successful exchange. If the receipt 'times out,' the transaction may be invalidated as per the regulatory agreement.

Figure 6:
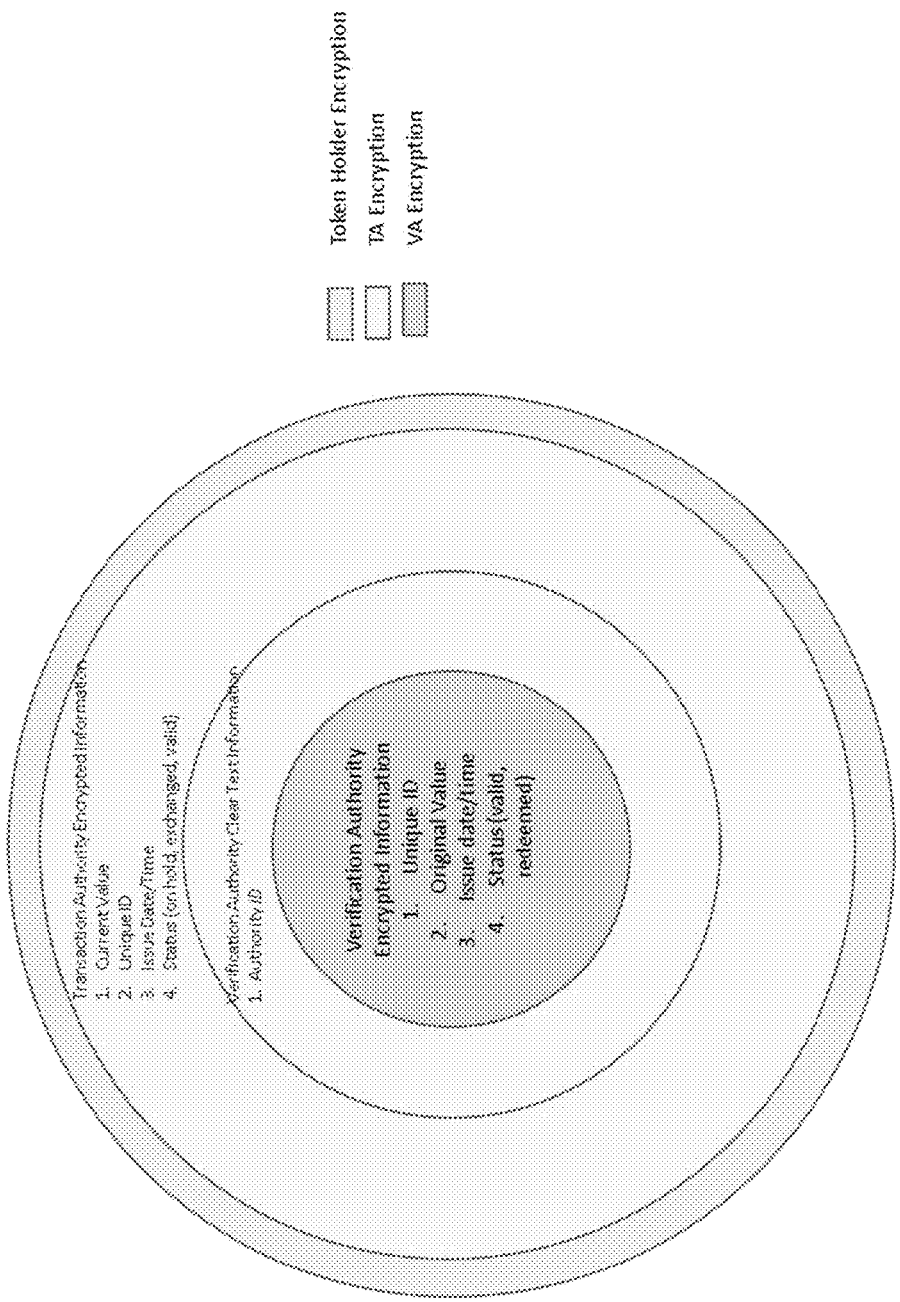
FIG. 6 shows an example token encryption scheme utilized in one example embodiment of the claimed invention.

The system and method of the claimed invention uses a layered encryption scheme where each party encrypts the token to store it and decrypts their layer when they wish to use it. For example, as shown in FIG. 6, the central portion of the token encryption scheme is performed by a verification authority, such as the issuing bank. The issuing bank/verification authority encrypts a unique identifier to the token as well as an original value, an issue date/time, and an initial status, such as valid, redeemed, and the like.

The transaction authority encrypts the token with the issuing bank/verification authority's public key so that the issuing bank/verification authority is the only party that can read their unique id and other token information that pertains to the issuing bank/verification authority. This is one mechanism the issuing bank/verification authority uses to avoid having to redeem spoofed tokens. Exact copies are possible (even while encrypted) so the issuing bank/verification authority also uses a token master file to ensure a token is redeemed only once. When the token is created by the transaction authority, a copy of the token amount and the unique id of the issuing bank/verification authority (similar in function to an ABA number on a paper check) are left clear text. Every party that takes part in the exchange needs to read that information. A copy of the token amount and unique ID of the issuing bank/verification authority are also included in the encrypted area as well.

The transaction authority then forwards this token to a token buyer who will then encrypt the token (all parts) with his key pair. Because a token must be decrypted to be used, this ensures that whoever attempts to spend this token must also have the private key for the token holder to decrypt it. So someone could copy a token but effectively could not spend it unless they also had a copy of the token holder's private key. In practice, this means the token will likely be spent on the phone or mobile device on which it is stored.

FIG. 1 shows an exemplary electronic transaction system 555 that that conducts the electronic exchange of valuable assets between buyers and sellers. The electronic transaction system 555 effects a transaction where the authentication of the buying and selling parties in the transaction is performed by a separate authority from the real time authentication of the asset value used in the transaction. The separate authentication of the parties provides personal anonymity, so that privacy is maintained, and no single authority has a complete audit trail of the transaction.

Multiple buying and selling computers can be used in the system 555 and likewise, multiple transaction authorities and banks can also be used in the system 555, such as when different buyers and sellers enlist different transaction authorities, currency routing authorities, currency retailers, and the like. For clarity and brevity, one of each of the computers, including a single buyer computer 100 and a single seller (token holder) computer 200, is shown in FIG. 1.

Buyer 100 is the party or entity that decides to purchase a good or service using the digital token. Seller/Token Holder 200 is the party or entity that makes a good or service available for purchase using the digital token. Dynamic Relay 300 is a network (e.g., Internet or other) connected computing device running a digital cash application that relays messages (including data packets) according to electronic instructions received and read through the digital cash application. The dynamic relay 300 does not make a persistent copy of the messages/data packets received or read. Authentication Authority (Registry) 400 is the party or entity empowered by the digital cash regulatory agreement to route messages, data, and files between Buyer, Seller, and a transaction authority/validating authority using dynamic relays, as needed.

Transaction Authority/Validating Authority 500 is the party or entity empowered in the digital cash regulatory agreement to verify the value used in the digital cash exchange, and to update and distribute the medium of exchange (e.g., token). Issuing Bank/Verification Authority 700 is the party or entity empowered by the digital cash regulatory agreement to hold deposits to back the money value represented in the medium of exchange (e.g., token), and to accept such medium in exchange for providing the deposited value to the holder. Depositing Bank/Verification Authority 800 is the party or entity empowered by the digital cash regulatory agreement to hold deposits to back the money value represented in the medium of exchange (e.g., token), and to accept such medium in exchange for providing the deposited value to the holder.

Example Transactions

As shown in FIGS. 1-5, an electronic exchange of assets can include a number of parties, depending upon the nature of the transaction. Digital tokens are purchased, issued, validated, and redeemed using the system 555 of the claimed invention. The electronic asset exchange system 555 separates the authentication of the parties involved from the validation of the asset (currency) to provide a secure transaction and personal anonymity, so that privacy is maintained, and no single authority has a complete audit trail of the transaction.

Purchase of Tokens

Figure 2:
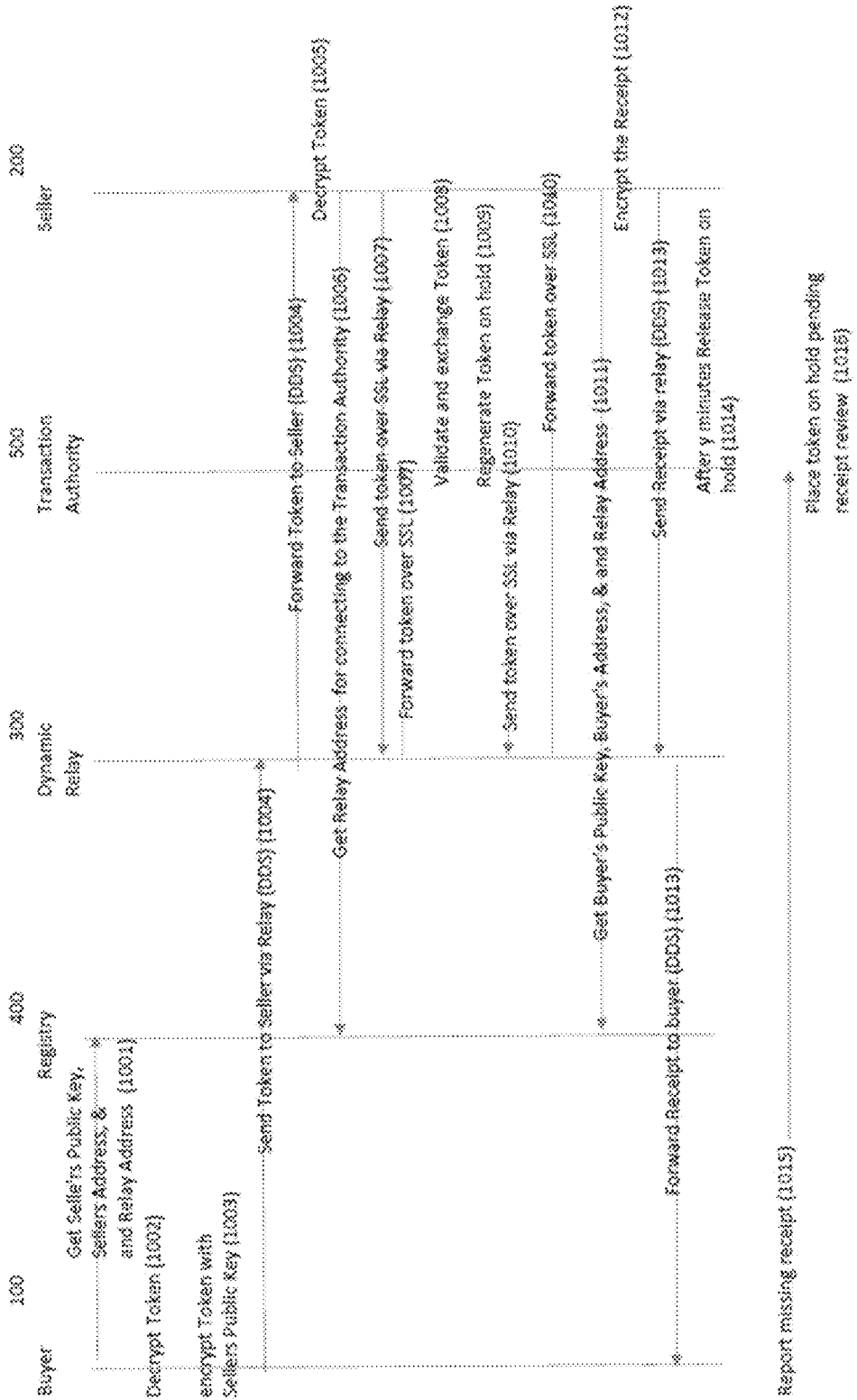
FIG. 2 shows an example system and method for purchasing a digital token in accordance with the claimed invention.

As shown in FIGS. 1 and 2, a buyer 100 starts purchase transaction in block 1001 by placing an SSL request to the registry 400 to obtain the seller's public key, seller's address, and the address of a dynamic relay 300 to be used to contact a seller 200. Similarly, the request can also be made using TLS protocols to exchange keys. The buyer 100 then selects a digital stored value token stored in a wallet on his computing device and decrypts it in block 1002. The buyer's digital wallet can include a computer readable medium such as a memory device, a software application that operates in conjunction with the memory device, and additional computer infrastructure necessary to access, retrieve, store, and manipulate files in the digital wallet as discussed below with regard to FIG. 7.

In block 1003, the digital stored value token is encrypted with the seller's public key that was retrieved in block 1001.

The buyer 100 then sends the encrypted token over a DDS line to the seller 200 via a dynamic relay 300 in block 1004. For an NFC exchange, the buyer and seller place their hardware devices (e.g., mobile phones, tablet computers, and the like) in proximity such that a wireless NFC connection is made. The seller 200 decrypts the token in block 1005 and then calls the authentication authority (registry 400) in block 1006 to dynamically obtain an address of a relay 300 to use to connect to the transaction authority (validating authority 500) and to send the token to the transaction authority. The seller 200 then sends the token to the transaction authority 500 over SSL via the dynamic relay 300 in block 1007.

Figure 4:
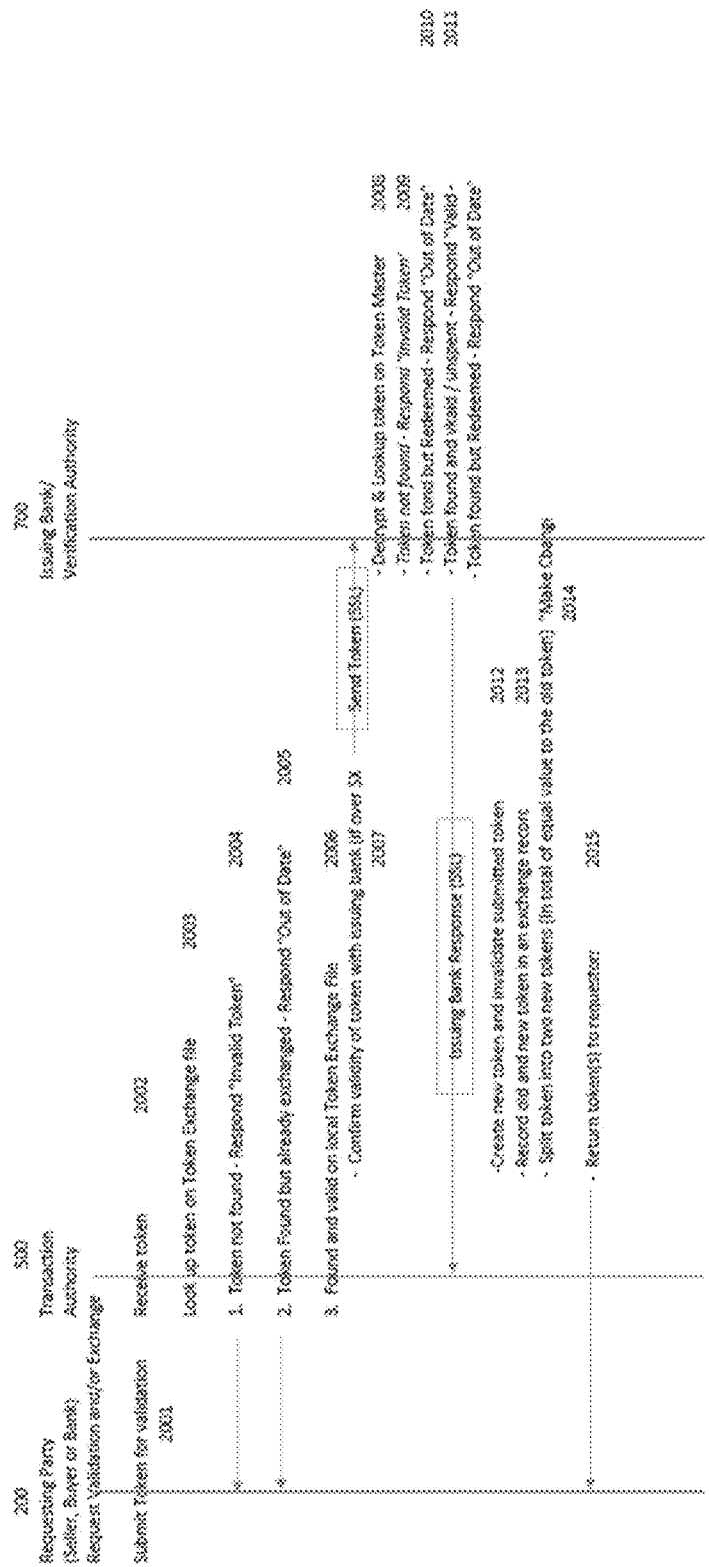
FIG. 4 shows an example system and method for validating a digital token in accordance with the claimed invention.

In block 1008, the transaction authority 500 validates the token as described in further detail with regard to FIG. 4. The transaction authority 500 updates their records of exchanged tokens (also in block 1008) and then (re)generates new token(s) in block 1009 to represent updated ownership of the token by the seller 200. The new token is marked as "on hold" on a token exchange register in the transaction authority 500 for a predetermined amount of time to allow time for the buyer 100 to confirm receipt of the payment receipt. The amount of time that the token is on hold can be subject to provisions of a regulatory agreement or other arrangement.

When payment for the good or service is not exact, and when the token has to be broken into two tokens to make change, the second token is created in the amount of the remainder if the value of the token submitted by the buyer 100 is greater than the purchase price.

The new token created (regenerated) for the purchase amount is then sent over SSL via dynamic relay 300 in block 1010 to the seller 200. The seller 200 then contacts the registry 400 in block 1011 to obtain the address of the buyer 100, the buyer's public key, and the address of a dynamic relay 300 with which to contact the buyer 100. The seller 200 then creates and encrypts a receipt in block 1012 and the sends the receipt and any remainder token to the buyer 100 via relay 300 using DDS.

The "on hold" token sent to the seller is released after a predetermined period of time. That is, the status of the token sent to the seller 200 is changed automatically from "on hold" to "valid" in block 1014 after a predetermined amount of time. The predetermined amount of time allows a buyer 100 the opportunity to report problems with the transfer. For example, in block 1015, the buyer 100 can report a missing receipt to the transaction authority 500, which will extend the hold time for the seller token by another predetermined time to allow for researching the missing receipt (see block 1016).

Issue Tokens

Figure 3:
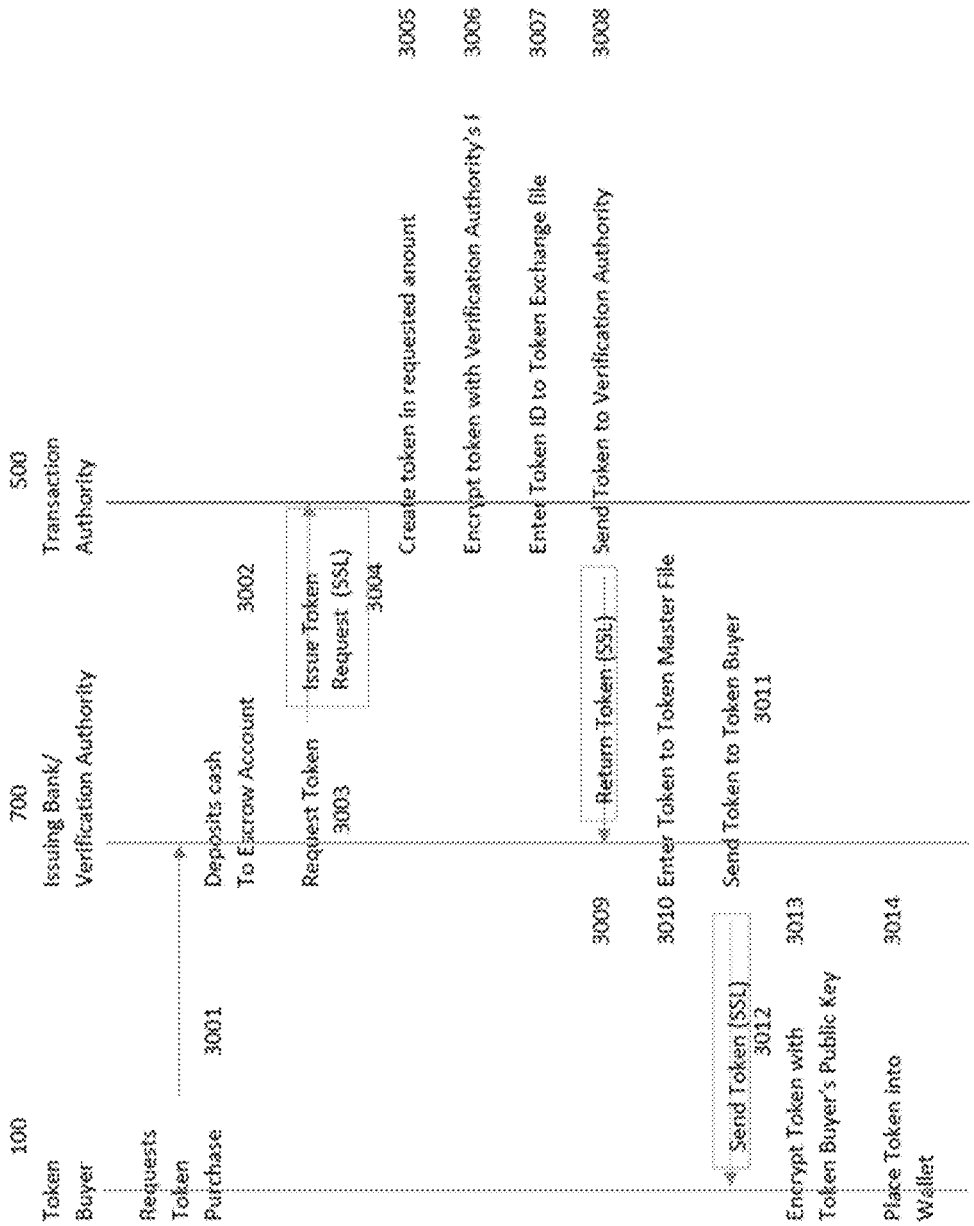
FIG. 3 shows an example system and method for issuing a digital token in accordance with the claimed invention.

As shown in FIGS. 1 and 3, tokens are issued in response to a buyer requesting a token purchase in block 3001. The buyer of the token (token buyer) can be a user that first buys the token from an issuing bank 700 or other verification authority. Similarly, a user that later purchases a good or service from a seller using a digital token is a buyer of goods or services. In the context of issuing tokens, the description below refers to a "token buyer" 100 that is a user obtaining tokens from an issuing bank/verification authority 700.

In block 3001, the token buyer 100 requests a token purchase in a specific amount and sends this request to an issuing bank/verification authority 700. The issuing bank/verification authority 700 then removes money from an account of the token buyer 100 and places money in an escrow account in block 3002. The issuing bank/verification authority 700 then creates a token request in block 3003 in the amount requested by the buyer 100 and sends that token request over SSL to the transaction authority/validating authority 500 in block 3004. The transaction authority/validating authority 500 then creates a token in block 3005 and encrypts the token with the public key of the issuing bank/verification authority 700 in block 3006. The transaction authority/validating authority 500 logs the token in a token exchange file in block 3007 and sends the token back to the issuing bank/verification authority 700 in block 3008 over an SSL line (block 3009).

Once the token has been returned to the verification authority 700, the verification authority 700 logs the token in a token master file in block 3010 and sends the token to the token buyer 100 in block 3011 over an SSL line (block 3012). The token buyer 100 then encrypts the token with his public key in block 3013 and places the token into his digital wallet in block 3014.

Validate Tokens

FIGS. 1 and 4 show the transaction process for validating issued tokens. Buyers, sellers, and other requestors and depositors can request validation of issued tokens to ensure purchases can be consummated. In the example validation process described below, a seller is the requesting party.

In block 2001, a token validation requestor (seller 200) sends a request to validate a token along with a decrypted token to the transaction authority/validating authority 500. The transaction authority/validating authority 500 receives the token in block 2002, and looks up the token in a token exchange file in block 2003. The token exchange file provides records of the token exchanges. For example, when a token with an identifier "A" is exchanged for a token with an identifier "B1 and a token with identifier "B2," there will be two token records in this token exchange file (one token record for the B1 token and one token record for the B2 token). If the token or token identifier is not found in the token exchange file, the transaction authority/validating authority 500 responds to the depositing bank/verification authority 800 with a notice that the token is invalid. For example, when a validation request for token X is received, the system sends an "invalid token" message to the seller 200 in block 2004 because there is no token exchange record for token X. If the Token is found on the token exchange file but has already been exchanged, the transaction authority/validating authority 500 responds to the seller 200 with an "Out of Date" message in block 2005. For example, when a validation request for token A is received, the system sends an "out-of-date" message to the seller in block 2005 because the token exchange record for token A will show that token A was exchanged for tokens B1 and B2. If the Token is found and not already exchanged, then the transaction authority/validating authority 500 checks the token amount to see if it is larger than a threshold amount which requires validating the token with the verification authority in block 2007). For example, if the token amount is larger than $5,000, the transaction authority/validating authority 500 validates the token with the issuing bank/verification authority 700. The threshold amount can be stipulated in the regulatory agreement which spells out the method and responsibilities for handling digital cash tokens and the money deposits backing them up.

If the token amount exceeds the validation threshold of the issuing bank/verification authority 700, the token is sent to the issuing bank/verification authority 700 and the issuing bank/verification authority 700 then looks up the token on a token master file in block 2008. The token master file provides a list of all tokens issued by the bank/verification authority 700. The token master file shows if the token has been redeemed, not redeemed, or partially redeemed. The token master file can be similar to the structure of the token exchange file maintained by the transaction authority, but the token master file does not show every intermediate transaction. The token master file links only the original issued token and the token version at the time that token is redeemed for non digital cash (normal cash).

If the token is not found in the token master file, in block 2009 the issuing bank/verification authority 700 responds with an "Invalid Token" message to the transaction authority/validating authority 500. If the token is found in the token master file but has already been redeemed, then the issuing bank/verification authority 700 sends a message "Out of Date" to the transaction authority/validating authority 500 in block 2010. Otherwise, if the token is found in the token master file and has not been redeemed, then the issuing bank/verification authority 700 sends the message "Valid" to the transaction authority/validating authority 500 in block 2011.

In the example transactions shown in FIGS. 1-6, an SSL connection is shown as the connection between verification authorities/issuing banks and the transaction authority since no privacy between these two parties is needed. Both the transaction authority and the verification authority/issuing bank will have static IP addresses, which are addressable. Both parties will be fully known to each other, unlike buyers and sellers who are given a measure of privacy under the claimed invention. SSL maintains security (important) without having to ping the authentication authority (registry) for private keys and the like.

If the token is valid, in block 2012 the transaction authority/validating authority 500 creates a new token or tokens in equal value to the token submitted for validation and then, in block 2013, the transaction authority/validating authority 500 invalidates the submitted token on the token exchange file. If change is needed, the token is split into two new tokens equaling the value of the submitted token in block 2014. The transaction authority/validating authority 500 then sends the new token(s) to the requestor (seller 200) in block 2015.

Redeem Tokens

Figure 5:
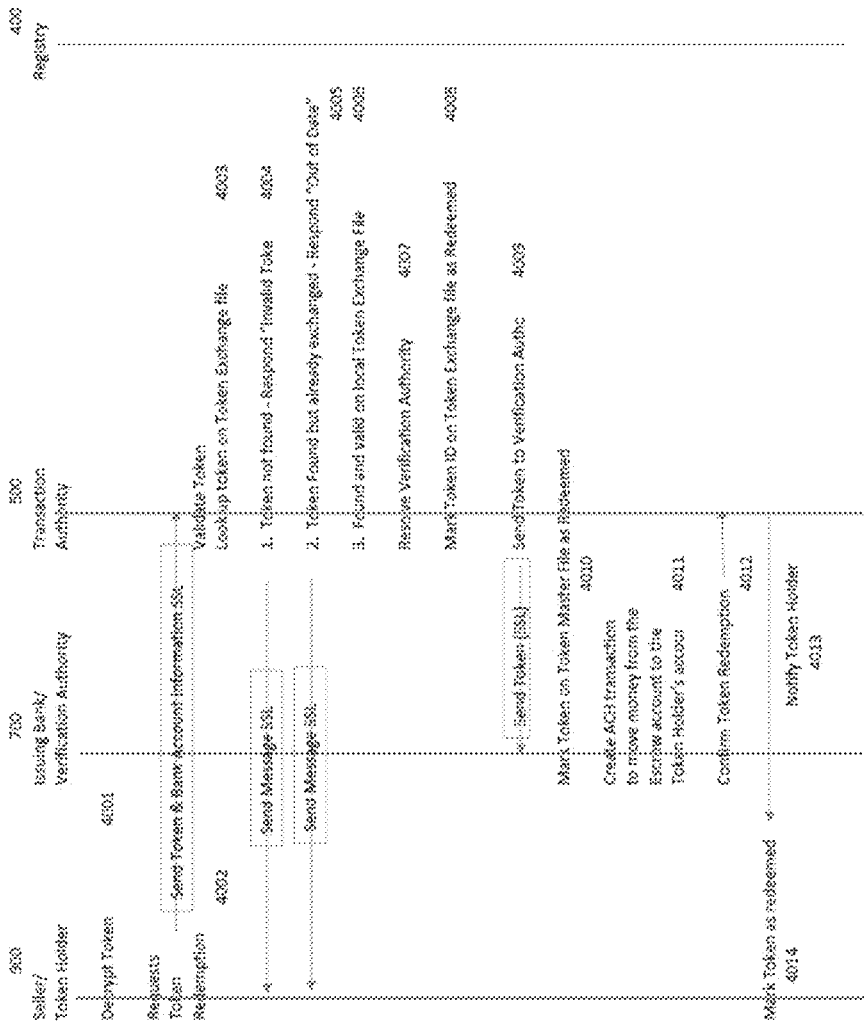
FIG. 5 shows an example system and method for redeeming a digital token in accordance with the claimed invention.

FIGS. 1 and 5 show the transaction process for redeeming valid tokens. Buyers, sellers, and other requestors and depositors can redeem valid tokens to conclude purchase transactions. In the example redemption process described below, a seller is the token holder requesting redemption of a valid token.

To redeem a token for money, a token holder (seller 200) decrypts the token in block 4001 and sends the token and a redemption request to the transaction authority/validating authority 500 in block 4002. The redemption request includes account information where the seller would like the proceeds of the transaction sent (deposited). The transaction authority/validating authority 500 then looks the token up on the token exchange file in block 4003. If the token is not found, then the transaction authority/validating authority 500 responds to the token holder (seller 200) with an "Invalid Token" message in block 4004. Similarly, if the token is found but has already been redeemed or otherwise exchanged, the transaction authority/validating authority 500 can respond with an "Out of Date" message in block 4005. If the token is found in the token exchange file and has not been exchanged (in block 4006), the token is read in block 4007 to determine the identity of the issuing bank/verification authority 700 that issued the token. The token is then marked as redeemed in block 4008, and the token is sent to the issuing bank/verification authority in block 4009 along with the redemption request.

In block 4010, the issuing bank/verification authority 700 marks the token as redeemed on its token master file and creates a money transfer transaction from the issuing bank/verification authority 700 to the token holder's (seller 200) bank account in block 4011. For example, an Automated Clearing House (ACH) transaction can be created to move money from the escrow account to the token holder's (seller 200) bank account in a debit/credit accounting fashion.

Once the transaction is created, the issuing bank/verification authority 700 confirms redemption of the token to the transaction authority/validating authority 500 in block 4012. The transaction authority/validating authority 500 notifies the token holder (seller 200) that the redemption is completed in block 4013. The token holder (seller 200) marks the token as redeemed in block 4014.

Computer Device Description

Each of the computers 100, 200, 300, 400, 500, 700, 800 in the system 555 can include a central processing unit (CPU), controller or processor, a memory, and an interface system which are coupled together by a bus or other link, although other numbers and types of each of the components and other configurations and locations for the components can be used.

Figure 7:
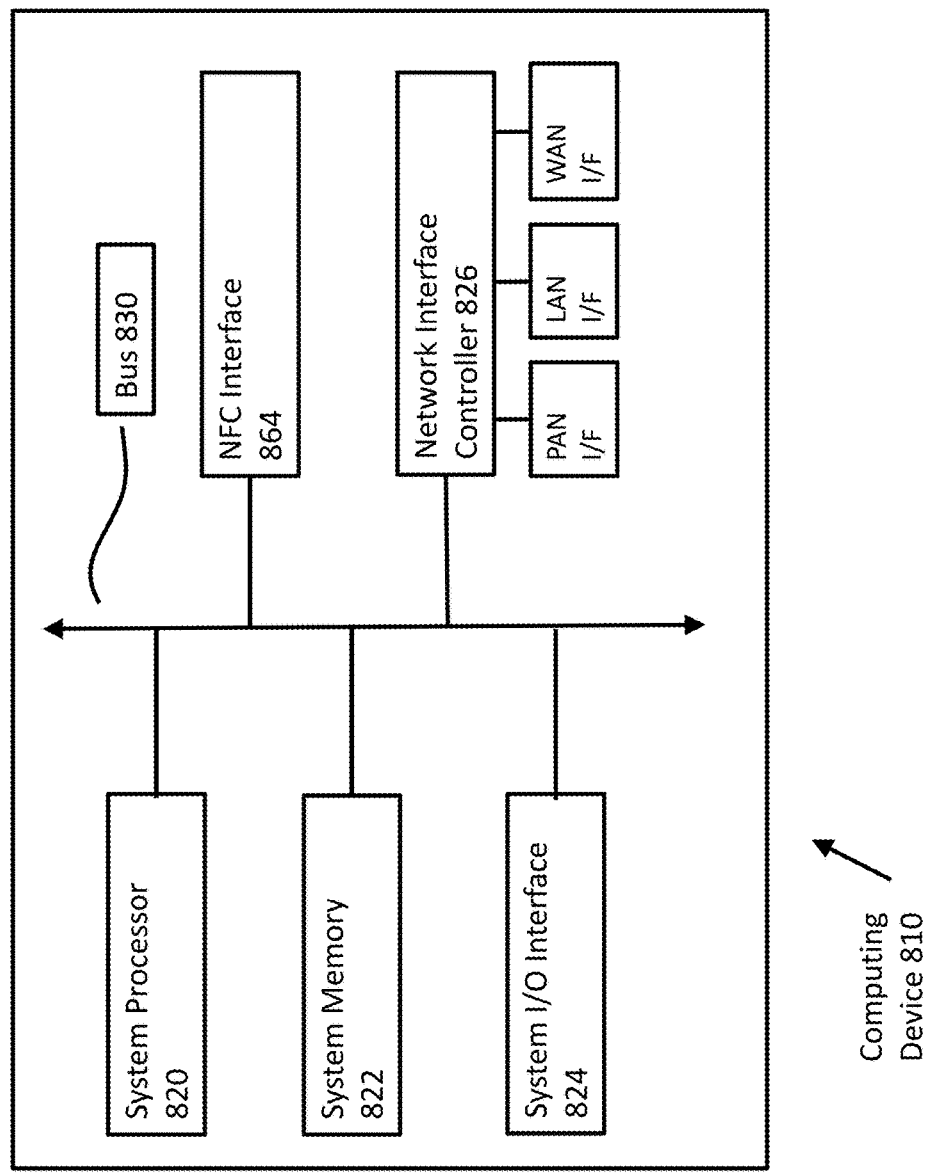
FIG. 7 shows an example electronic transaction computing device in accordance with the claimed invention.

As shown further in FIG. 7, the electronic exchange computing devices of the claimed invention, including the issuing bank/verification authority, buyer, authentication authority (registry), seller/token holder, depositing bank/verification authority, dynamic relay, and transaction authority/validating authority are shown as an example "computing device" 810. Computing device 810 includes system processor(s) 820, system memory 822, system I/O interface(s) 824, and network interface controller 826, which are coupled together by a bus 830 or other numbers and types of links, although the electronic exchange computing devices 810 can include other components and elements in other configurations. In this example, the electronic exchange computing device 810 is implemented as a stand-alone device, although the electronic exchange computing devices 810 could be implemented as blade devices in a chassis-blade implementation, for example.

System processor 820 includes one or more microprocessors configured to execute computer/machine readable and executable instructions stored in system memory 822 to implement the electronic exchange system on a client server network system, such as system 555, for example. When executed by at least one processor, the instructions stored in system memory 822 cause the processor 820 to purchase, issue, validate, and redeem tokens and conduct the electronic exchange. The instructions on the computer readable medium, including system memory 822, further cause the processor 820 to perform steps including purchasing tokens, issuing tokens, validating tokens, redeeming tokens, and otherwise conducting an electronic value (currency) exchange between a buyer and a seller.

The system processor 820 is configured to execute computer/machine readable and executable instructions stored in system memory 822 to implement one or more portions of the processes described above and further below in connection with FIGS. 1-7, for example, although processor 820 can comprise other types and/or combinations of processors, such as digital signal processors, micro-controllers, switch chips, bus controllers, application specific integrated circuits ("ASICs"), programmable logic devices ("PLDs"), field programmable logic devices ("FPLDs"), field programmable gate arrays ("FPGAs"), and the like, programmed or configured according to the teachings as described and illustrated with respect to FIGS. 1-7.

System memory 822 includes computer readable media, namely computer readable or processor readable storage media, which are examples of machine-readable storage media. Computer readable storage/machine-readable storage media can include volatile, nonvolatile, removable, and non-removable media implemented in any method or technology for storage of information, such as computer readable/machine-executable instructions, data structures, program modules, or other data, which can be obtained and/or executed by one or more processors, such as system processor 820, to perform actions, including implementing an operating system for controlling the general operation of electronic exchange computing device 810 to purchase tokens, issue tokens, validate tokens, redeem tokens, and otherwise conduct an electronic value (currency) exchange in accordance with the processes described above in connection with FIGS. 1-7, for example.

Examples of computer readable storage media include RAM, BIOS, ROM, EEPROM, flash/firmware memory or other memory technology, CD-ROM, digital versatile disks (DVD) or other optical storage, magnetic cassettes, magnetic tape, magnetic disk storage or other magnetic storage devices, or any other medium which can be used to store the desired information, including data and/or computer-executable instructions or other machine-executable instructions, and which can be accessed by a computing or specially programmed device, such as electronic exchange computing devices 810. When the instructions stored in system memory 822 are run by the system processor 820, the electronic exchange computing device 810 implements at least a portion of the processes described further below to conduct the exchange of valuable assets in connection with FIGS. 1-7, in addition to the various client-server management related functions, including redundancy functions, version controls, server load balancing functions, device configuration functions (e.g., defining network security policies), VPN hosting, network traffic management, loss control, and other functions.

System I/O interface(s) 824 includes one or more user input and output device interface mechanisms, such as a computer keyboard, mouse, display device, and the corresponding physical ports and underlying supporting hardware and software to enable the electronic exchange computing devices 810 to communicate with the outside environment for accepting user data input and to provide user output, although other types and numbers of user input and output devices can be used. Alternatively or in addition, as will be described in connection with network interface controller 826 below, the electronic exchange computing devices 810 can communicate with the outside environment for certain types of operations (e.g., configuration) via a network management port, for example.

Network interface controller 826 provides physical access to a networking medium and provides a low-level addressing system, which enables the electronic exchange computing devices 810 to engage in TCP/IP communications over network system 555 (shown in FIG. 1) and purchase tokens, issue tokens, validate tokens, redeem tokens, and otherwise conduct an electronic value (currency) exchanges between buyers and sellers (instantiated on computer devices) and to maintain application services although the network interface controller 826 can be constructed for use with other communication protocols and types of networks, and can include other components, and can perform other functions. Network interface controller 826 is sometimes referred to as a transceiver, transceiving device, or network interface card (NIC), which transmits and receives network data packets to one or more networks, such as system 555 in this example. When the electronic exchange computing device 810 includes more than one system processor 820 (or a processor 820 has more than one core), each processor 820 (and/or core) can use the same single network interface controller 826 or a plurality of network interface controllers 826. Further, the network interface controller 826 can include one or more physical ports, such as Ethernet ports, to couple the electronic exchange computing devices 810 with other network devices, such as servers and other sites. Additionally, the network interface controller 826 can include certain physical ports dedicated to receiving and/or transmitting certain types of network data, such as device management related data for configuring the electronic exchange computing devices 810.

In one example, the network interface controller 826 is an FPGA that can include a local memory and be configured with logic to implement one or more aspects of the technology, including by way of example only, purchasing tokens, issuing tokens, validating tokens, redeeming tokens, and otherwise conducting an electronic value (currency) exchange, although the network interface controller 826 can include other types of configurable hardware, such as digital signal processors, micro-controllers, ASICs, PLDs, FPLDs, and the like, programmed or configured according to the teachings as described and illustrated herein with respect to FIGS. 1-7, as well as software executed by the system processor 820, combinations thereof, and other components and elements configured in other manners which could implement one or more aspects of the technology. The use of specialized hardware in this example allows the network interface controller 826 to rapidly process network data packets.

Some example embodiments of the computing device 810 can also include a near field communication (NFC) interface 864. The NFC interface 864 can allow for extremely close range communication at relatively low data rates (e.g., 424 kb/s), and can comply with such standards as ISO/IEC 18092, ECMA-340, ISO/IEC 21481, ECMA-352, ISO 14443, and/or ISO 15693. The NFC interface 864 can have a range of approximately 2-4 cm. The close range communication with the NFC interface 864 can take place via magnetic field induction, allowing the NFC interface 864 to communicate with other NFC interfaces 864 or to retrieve information from tags having radio frequency identification (RFID) circuitry and with other NFC-equipped computing devices 810. The NFC interface 864 can enable initiation and/or facilitation of data transfer of documents, and other data from one computing device 810 to another computing device 810, including tokens and payments to and from buyers 100 and sellers in the system 555 as shown in FIG. 1.

Bus 830 includes at least one internal device component communication bus, link, bridge and supporting components, such as bus controllers and/or arbiters. These devices enable the various components of the electronic exchange computing device 810, such as the system processor 820, system memory 822, system I/O interface 824, and network interface controller 826, to communicate, although the bus 830 can enable one or more components of the electronic exchange computing device 810 to communicate with components in other devices as well. By way of example only, example buses include HyperTransport, PCI, PCI Express, InfiniBand, USB, Firewire, Serial ATA (SATA), SCSI, IDE and AGP buses, although other types and numbers of buses can be used, and the particular types and arrangement of buses will depend on the particular configuration of electronic exchange computing device 810.

While each of the computers can include the processor 820, memory 822, network interface controller 826, and I/O interface 824 coupled together by a bus 830, two or more computing systems or devices can be substituted for any one of the devices in the system 555. Accordingly, principles and advantages of distributed processing, such as redundancy, replication, and the like, also can be implemented as desired to increase the robustness and performance of the devices and systems of the system 555. The system 555 can also be implemented on a computer system or systems that extend across any network environment using any suitable interface mechanisms and communications technologies including, for example telecommunications in any suitable form (e.g., voice, modem, and the like), Public Switched Telephone Network (PSTNs), Packet Data Networks (PDNs), the Internet, intranets, a combination thereof, and the like.

As outlined above, each of the client computers, sites, and servers can include a central processing unit (CPU), controller or processor, a memory, and an interface which are coupled together by a bus or other link, although other numbers and types of each of the components and other configurations and locations for the components can be used. The processors in the computing devices can execute a program of stored instructions for one or more aspects of the methods and systems as described herein, although the processor could execute other types of programmed instructions. The memory can store these programmed instructions for one or more aspects of the methods and systems as described herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory. The user input device can include a computer keyboard and a computer mouse, although other types and numbers of user input devices can be used. The display can include a computer display screen, such as a CRT or LCD screen by way of example only, although other types and numbers of displays could be used.

Although an example of the electronic exchange computing devices 810 are described and illustrated in connection with FIG. 7, each of the computers and computing devices of the system 555 could be implemented on any suitable computer system or computing device. It is to be understood that the example devices and systems of the system 555 are for exemplary purposes, as many variations of the specific hardware and software used to implement the system 555 are possible, as will be appreciated by those skilled in the relevant art(s).

Further, each of the devices of the system 555 can be conveniently implemented using one or more general purpose computer systems, microprocessors, digital signal processors, micro-controllers, application specific integrated circuits (ASIC), programmable logic devices (PLD), field programmable logic devices (FPLD), field programmable gate arrays (FPGA) and the like, programmed according to the teachings as described and illustrated herein, as will be appreciated by those skilled in the computer, software, and networking arts.

The operation of example processes to provide a system and method of purchasing tokens, issuing tokens, validating tokens, redeeming tokens, and otherwise conducting an electronic value (currency) exchanges shown in FIGS. 1-7 can be run on the electronic exchange system 555. The flow diagrams of FIGS. 1-7 are representative of example machine readable instructions for implementing the process of conducting the electronic exchange. The steps described above are example machine readable instructions for implementing a method in accordance with the examples described in this disclosure. In one example, the machine readable instructions include an algorithm for execution by: (a) a processor, (b) a controller, and/or (c) one or more other suitable processing device(s). The algorithm can be instantiated in software stored on tangible media such as, for example, a flash memory, a CD-ROM, a floppy disk, a hard drive, a digital video (versatile) disk (DVD), or other memory devices, but persons of ordinary skill in the art will readily appreciate that the entire algorithm and/or parts thereof could alternatively be executed by a device other than a processor and/or embodied in firmware or in dedicated hardware in a known manner. For example, the algorithm can be implemented by an application specific integrated circuit (ASIC), a programmable logic device (PLD), a field programmable logic device (FPLD), a field programmable gate array (FPGA), discrete logic, etc.). For example, any or all of the components of the electronic exchange system could be implemented by software, hardware, and/or firmware. Also, some or all of the machine readable instructions described herein can be implemented manually. Further, although an example of the present invention is described and illustrated herein, persons of ordinary skill in the art will readily appreciate that many other methods of implementing the example machine readable instructions can alternatively be used. For example, the order of execution can be changed, and/or some of the steps described can be changed, eliminated, or combined.

By performing a method of electronic exchange using a system described above, if a buyer wishes to exchange an item of value for another item of value, an anonymous and secured exchange is accomplished.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as can be specified in the claims. Accordingly, the invention is limited only by the following claims and equivalents thereto.

The claimed invention is:

1. A computer-implemented method of splitting a real-time digital monetary transaction on a payment network into an authorization of parties to the transaction by an authentication authority server and verification of currency of the transaction by a separate transaction authority server wherein neither the separate authentication authority server nor the transaction authority server can reconstruct or log the complete transaction, the method comprising:
   a) authorizing first and second parties to the transaction by the authentication authority server, including:
      1) receiving, by the authentication authority server, a transaction ID from the first party to the transaction and from the second party to the transaction generated by an anonymous handshake by a digital cash application executing on computing devices of the first party and of the second party to the transaction;
      2) verifying, by a digital cash application executing on the authentication authority server, membership of the first and second parties in the payment network based on the received transaction IDs by the authentication authority server;
      3) confirming membership account status, by the digital cash application executing on the authentication authority server, that the parties are authorized to conduct an electronic transaction on the payment network;
      4) authorizing, by the digital cash application executing on the authentication authority server, the first and second parties to the transaction to continue to access payment software in the digital cash application executing on the computing devices of the first and second parties to the transaction;
   b) sending, by the digital cash application executing on a computing device of the first party to the transaction, a digital stored value token to the digital cash application executing on a computing device of the second party to the transaction, including:
      1) establishing, by the transaction authority, a delivery route for transmission of the currency of the transaction, wherein the delivery route is based on location and addressability status of the first and second parties; and
      2) wherein the digital stored value token is an encrypted electronic file and serves as the currency of the transaction;
   c) sending the digital stored value token from the computing device of the second party to the transaction to a verification authority server via the transaction authority server, and wherein the verification authority server and the transaction authority server are separate entities from the authentication authority server, such that neither the verification authority server nor the transaction authority server nor the authentication authority server possesses both party and currency information to reconstruct the transaction, including:
      1) forwarding, by the computing device of the second party to the transaction, the digital stored value token to a digital cash application executing on the transaction authority server;
      2) reading, by the digital cash application executing on the transaction authority server, an encrypted layer of the digital stored value token;
      3) identifying, by the digital cash application executing on the transaction authority server, an identity of the verification authority server that issued the digital stored value token based on reading the encrypted layer of the digital stored value token; and
      4) sending, by the digital cash application executing on the transaction authority server, the digital stored value token to a digital cash application executing on the verification authority server;
   d) validating, with the digital cash application executing on the verification authority server the digital stored value token, including:
      1) reading the received digital stored value token to identify a unique token identifier of the digital stored value token;
      2) comparing the token identifier of the received digital stored value token to a token exchange file stored in a database accessed by the verification authority server;
      3) matching the token identifier of the received digital stored value token to a file listing valid token identifiers to identify the digital stored value token as valid;
      4) invalidating the received digital stored value token and regenerating a new digital stored value token of the same value with a new token identifier to update ownership to the second party to the transaction;
      5) sending the new digital stored value token to the digital cash application executing on the transaction authority server;
   e) sending, by a transmission route established by the transaction authority server, the new digital stored value token to the second party to the transaction, including:
      1) appending, by the transaction authority server, the new digital stored value token with the identity of the verification authority server; and 2) sending, by the transaction authority server, the appended digital stored value token to the digital cash application executing on the computing device of the second party; and 3) receiving, by the digital cash application executing on the computing device of the second party, the appended digital stored value token; and 4) storing the received appended digital stored value token.

2. A method of claim 1, wherein sending the digital stored value token from the digital cash application executing on the computing device of the first party to the transaction to the digital cash application executing on the computing device of the second party to the transaction is performed on a peer-to-peer (p2p) network.

3. A method of claim 1, wherein the payment network is at least one of the Internet, WiFi, or a local area wireless network.

4. A method of claim 1, wherein sending the appended digital stored value token to the digital cash application executing on the computing device of the second party is performed using near field communications (NFC) protocols.

5. A method of claim 1, wherein the digital stored value token is sent from the digital cash application executing on the computing device of the first party to the transaction to the digital cash application executing on the computing device of the second party to the transaction using at least one of Secure Sockets Layer (SSL) and Transport Layer Security (TLS) transmission protocols.

6. A method of claim 1, wherein the digital stored value token is sent from the computing device of the second party to the transaction to the verification authority server using at least one of Secure Sockets Layer (SSL) and Transport Layer Security (TLS) transmission protocols.

7. A method of claim 1, wherein the transaction ID received from the first party to the transaction by the authentication authority server includes an electronic request for a public key of the computing device of the second party to the transaction; and
 the method further comprises the first party to the transaction encrypting the digital stored value token with the obtained public key of the second party to the transaction; and
 wherein sending the digital stored value token to the second party to the transaction includes sending the encrypted digital stored value token to the second party to the transaction; and
 the method further comprises decrypting an outermost layer of the encrypted digital stored value token received by the second party to the transaction; and
 wherein sending the digital stored value token from the second party to the transaction to the verification authority server includes sending the decrypted digital stored value token from the second party to the transaction to the verification authority server; and
 wherein the method further comprises the transaction authority decrypting the digital stored value token to reveal the identification code of the verification authority and sending the digital stored value token to the verification authority;
 wherein validating the digital stored value token with the verification server includes decrypting an innermost layer of encryption to review the token identifier and validating the decrypted digital stored value token with the verification authority server; and wherein regenerating a new digital stored value token to update ownership of the digital stored value token to the second party to the transaction includes
 regenerating a new digital stored value token to update ownership of the decrypted digital stored value token to the second party to the transaction;
 encrypting the digital stored value token with a key of the verification authority;
 forwarding the digital stored value token to the transaction authority;
 encrypting the digital stored value token a second time with the key of the transaction authority;
 forwarding the stored value token to the second party of the transaction;
 encrypting the digital stored value token a third time with the key of the second party; and
 storing the digital stored value token in a digital wallet computer application running on the computing device of the second party.

8. A method of claim 1, wherein the transaction ID from the first party to the transaction to the authentication authority server includes sending a request to the digital cash application executing on the authentication authority that tracks and updates location and addressability status provided by the first party computer and the second party computer for a computer network address of a dynamic contact relay connected to the payment network to connect the first party computer and the second party computer;
 wherein sending the digital stored value token to the second party computer includes sending the digital stored value token to the second party computer via the dynamic contact relay; and
 wherein the dynamic contact relay is a third-party computing device that forwards the digital stored value token from the first party computer to the second party computer when the first party computer and second party computer cannot establish direct communications due to firewall restrictions, and wherein the dynamic contact relay prevents the second party computer from knowing the location of the first party computer, and wherein the dynamic contact relay is marshalled at the time the digital stored value token is sent and does not make a persistent copy of the digital stored value token and closes immediately after sending the digital stored value token to the second party computer.

9. A method of claim 1, wherein sending the digital stored value token from the second party computer to the verification authority server includes:
 sending a request generated by an executable application program running on the authentication authority server that tracks and updates location and addressability status provided by first party computer and second party computer;
 dynamically obtaining, based on the request, a computer network address of a dynamic transaction relay connected to the payment network to the verification authority server; and
 sending the digital stored value token from the second party computer to the verification authority server via the dynamic transaction relay; and
 wherein sending the new token to the second party computer includes:
 sending the new token to the second party computer via the dynamic transaction relay and
 wherein the dynamic transaction relay is a third-party computing device that forwards the new token from the first party computer to the second party computer when the first party computer and second party computer cannot establish direct communications due to firewall restrictions, and wherein the dynamic transaction relay prevents the second party computer from knowing the location of the first party computer, and wherein the dynamic transaction relay is marshalled at the time the digital stored value token is sent and does not make a persistent copy of the digital token and closes immediately after sending the digital token to the second party computer.

10. A method of claim 1, wherein receiving the transaction ID from the first party computer to the authentication authority server over the network includes obtaining a network addressability status of the second party computer and an on-off status of the second party computer to establish a direct p2p connection between the first party computer and second party computer; and wherein receiving the transaction ID from the second party computer to the authentication authority server includes obtaining a network addressability status of the first party computer, an on-off status of the first party computer to establish a direct p2p connection between the second party computer and first party computer.

11. A method of claim 1 further comprising:
updating records of token identifiers of exchanged tokens in the token exchange file in the database accessed by the verification authority server.

12. A method of claim 1 further comprising:
marking the regenerated new token as on hold on a token exchange register in the verification authority server for a predetermined amount of time for the first party computer to confirm delivery of a payment receipt;
changing the on hold marking to a valid marking after the predetermined amount of time when the first party computer does not report problems with delivery of the payment receipt; and
extending the on hold marking when the first party computer reports problems with delivery of the payment receipt.

13. A method of claim 1 further comprising:
splitting the regenerated new digital stored value token into at least two tokens, wherein the sum of a value of the at least two tokens equals the value of the regenerated new digital stored value token;
providing one of the at least two tokens to the first party computer when the token sent by the first party computer to the second party computer has a value greater than a purchase price in the transaction.

14. A method of claim 1, wherein responding to an issuing authority that issued the token with a notice of a status of validity of the submitted digital stored value token includes at least one of responding that the digital stored value token is invalid when an identifier of the digital stored value token is not found in the token exchange file;
responding with a notice that the digital stored value token is out of date when the identifier of the digital token is found in the token exchange file but the digital stored value token has already been exchanged; and
responding with a notice that the digital stored value token is valid when the identifier of the digital stored value token is found in the token exchange file and has not already been exchanged.

15. A method of claim 1, wherein the token exchange file provides an inventory of tokens in circulation, identification of the tokens, and the status of the tokens.

16. A method of claim 1, wherein validating the digital stored value token with the verification authority server further comprises:
checking a value of the received digital stored value token against a predetermined digital token amount in the token exchange file stored in the database accessed by the verification authority server;
sending the digital stored value token from the verification authority server to an issuing authority when the value exceeds the predetermined digital token amount;
comparing the digital stored value token against a token master file at the-issuing authority; and
responding with a notice of a status of validity of the submitted digital stored value token based upon the comparison of the digital stored value token to the token master file.

17. A method of claim 16, wherein responding with a notice of a status of validity of the submitted digital stored value token based upon the token master file includes at least one of:
responding with an invalid token message to the verification authority server when the identifier of the digital token is not found in the token master file;
responding with an out of date message to the verification authority server when the identifier of the digital stored value token is found in the token master file but the digital stored value token has already been redeemed; and
responding with a notice that the digital stored value token is valid to the verification authority server when the identifier of the digital stored value token is found in the token master file and the digital stored value token has not already been redeemed.

18. A method of claim 1, wherein the digital stored value token is assigned ownership by possessing the digital stored value token in a digital wallet computer application running on the computing device of the first party and by encrypting the digital stored value token with a public key of the first party.

* * * * *